Patented July 21, 1925.

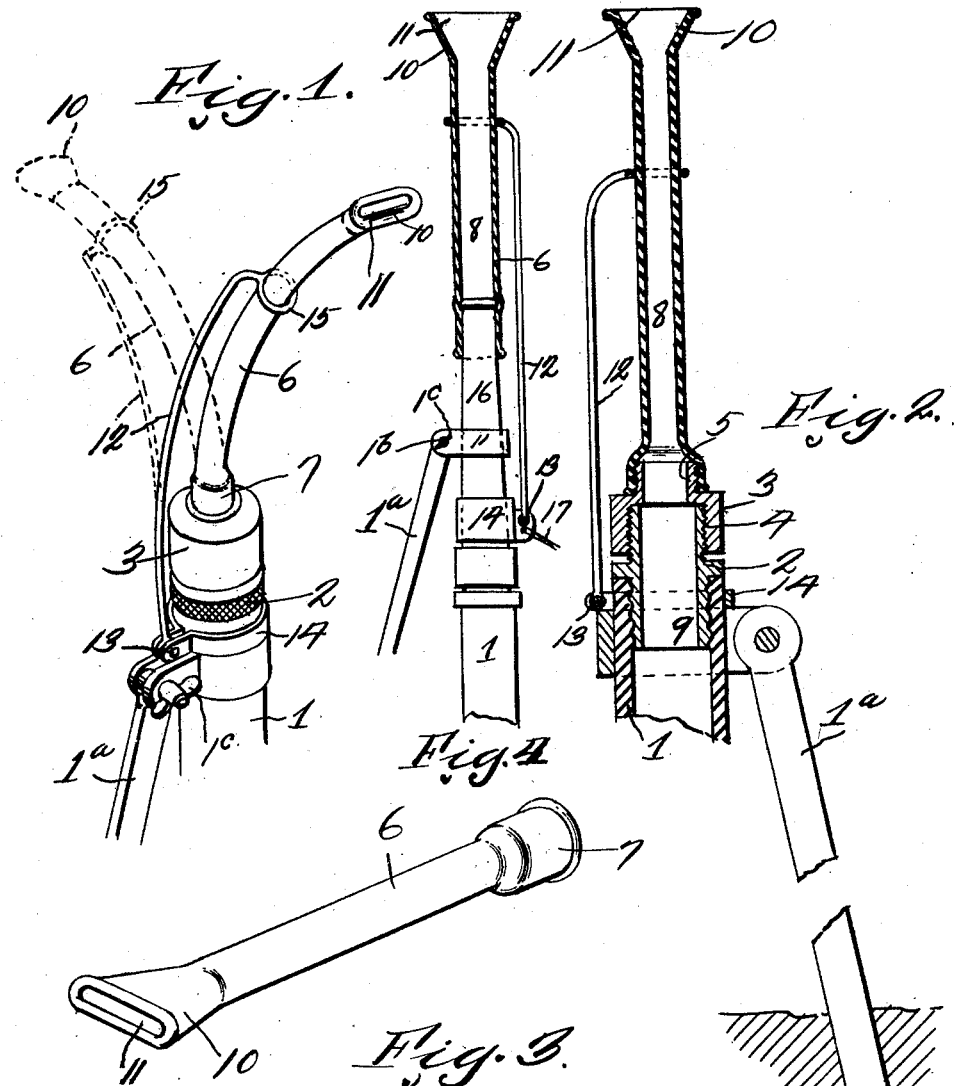

1,546,714

UNITED STATES PATENT OFFICE.

JAMES W. BUZBEE, OF OMAHA, NEBRASKA.

SPRAYING NOZZLE.

Application filed September 15, 1922. Serial No. 588,360.

*To all whom it may concern:*

Be it known that JAMES W. BUZBEE, citizen of the United States, residing at Omaha, in the county of Douglas and State of Nebraska, has invented certain new and useful Improvements in Spraying Nozzles, of which the following is a specification, reference being had therein to the accompanying drawings.

The invention relates to spraying nozzles, used in connection with garden hose, and has for its object to provide a nozzle formed from a flexible tubular member, preferably rubber, which nozzle when the water passes through the same, sways and moves in an arc, thereby spraying water over a large area, such for instance as a lawn. The hose is held in a vertical position by a supporting bracket.

A further object is to provide a reducer cap threaded on the hose coupling, on the reduced portion of which reducer cap the flexible nozzle is attached, thereby allowing the nozzle to be attached to a conventional form of garden hose.

A further object is to provide a flexible member carried by the hose and having its upper end connected to the nozzle and forming means for limiting the swaying of the nozzle.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a perspective view of the nozzle showing the same attached to a conventional form of garden hose.

Figure 2 is a vertical sectional view through the end of a garden hose and through the nozzle.

Figure 3 is a perspective view of the nozzle.

Figure 4 is a side elevation of a conventional form of garden hose, a conventional form of nozzle thereon and the flexible nozzle attached to the hose nozzle.

Referring to the drawing, the numeral 1 designates the end of a conventional form of garden hose, which end is supported in a vertical position by the supporting bracket 1ª adapted to be forced into the ground as shown in Figure 2. The hose 1 is provided with a conventional form of coupling 2 on which a reducing member 3 is threaded at 4. The reducing member 3 has secured to its reduced portion 5 a flexible nozzle 6, which nozzle is preferably formed from rubber, however it is to be understood that it may be formed from any suitable material. The inner end of the nozzle 6 is provided with an enlarged portion 7, which portion engages over the reduced portion 5 of the member 3 for securely holding the nozzle on the hose. Nozzle 6 has its passage 8 preferably restricted in relation to the passage 9 through the coupling 2, thereby insuring a steady flow of water through the nozzle at a maximum velocity. The outer end of the nozzle 6 is flared as at 10 and provided with elongated discharge opening 11, through which the water is sprayed. As the water passes through the flexible nozzle 6, the nozzle flexes against the action of the spring 12 to the full and dotted line positions shown in Figure 1 and rotates in such a manner that its flared portion 10 moves in an orbit, thereby uniformly spraying water over an area of the ground surrounding the hose 1. If so desired the nozzle may be round or any other shape in transverse cross section. The spring 12 is secured at 13 to a collar 14 carried by the hose, and has its upper end provided with a loop 15 through which the nozzle 6 extends. The spring acts to limit to a certain degree the flexing of the nozzle 6 under the influence of the water pressure.

Referring to Figure 4, the structure is substantially the same, with the exception that the flexible nozzle 6 is connected to the end of a conventional form of hose nozzle 16, and a wire or cord 17 is attached to the device for holding the same rigidly or for controlling the pivotal movement of the device as a whole on the pivotal point 1ᵇ and the supporting bracket 1ª when the thumb nut is loosened.

From the above it will be seen that a spraying nozzle is provided which is simple in construction, formed from a single piece of flexible tubing and one which may be easily and quickly applied to various sizes of couplings 2 or to conventional forms of hose nozzles as shown at 16 in the drawing.

The invention having been set forth what is claimed as new and useful is:—

The combination with a garden hose, of a spraying nozzle therefor, said spraying nozzle comprising a tubular member formed from flexible material, one end of said spraying nozzle being connected to the discharge end of the hose, an elongated straight flexible spring arm carried by the hose and anchored thereto, the upper end of said elongated spring arm terminating in an angularly disposed offset eye, said spraying nozzle extending through said eye.

In testimony whereof I hereunto affix my signature.

JAMES W. BUZBEE.